United States Patent [19]
Winkler et al.

[11] Patent Number: 5,922,941
[45] Date of Patent: Jul. 13, 1999

[54] MACHINE TOOL WITH A ROTATABLE SUPPORTED PART

[75] Inventors: Hans-Henning Winkler, Tuttlingen; Rudolf Haninger, Seitingen, both of Germany

[73] Assignee: Chiron-Werke GmbH & Co. KG, Tuttlingen, Germany

[21] Appl. No.: 08/833,357

[22] Filed: Apr. 4, 1997

[30] Foreign Application Priority Data

Apr. 6, 1996 [DE] Germany .......................... 196 13 934

[51] Int. Cl.⁶ .......................... B23Q 11/10; F16L 27/00; F16L 39/04
[52] U.S. Cl. .................. 73/40; 73/304 R; 73/46; 73/304 C
[58] Field of Search .................. 73/40, 46, 53.01, 73/304 R, 304 C

[56] References Cited

U.S. PATENT DOCUMENTS

| | | | |
|---|---|---|---|
| 3,893,658 | 7/1975 | Fisher | 266/36 P |
| 4,191,032 | 3/1980 | August | 64/27 B |
| 4,354,698 | 10/1982 | Linder et al. | 285/98 |
| 4,501,442 | 2/1985 | Partus | 285/190 |
| 4,683,912 | 8/1987 | Dubrosky | 137/580 |
| 4,803,869 | 2/1989 | Barcelona et al. | 73/53 |
| 4,844,124 | 7/1989 | Stich et al. | 137/580 |
| 4,845,472 | 7/1989 | Gordon et al. | 340/605 |
| 5,044,673 | 9/1991 | Jones, Jr. | 285/134 |
| 5,174,614 | 12/1992 | Kaleniecki | 285/279 |
| 5,546,009 | 8/1996 | Raphael | 324/694 |
| 5,646,539 | 7/1997 | Codina et al. | 324/678 |

FOREIGN PATENT DOCUMENTS

| | | |
|---|---|---|
| 3319 618 A1 | 12/1984 | Germany . |
| 3401 079 A1 | 7/1985 | Germany . |
| 43 24 952 A1 | 1/1995 | Germany . |
| 59-154334 | 9/1984 | Japan . |

*Primary Examiner*—Hezron Williams
*Assistant Examiner*—J. David Wiggins
*Attorney, Agent, or Firm*—Cummings & Lockwood

[57] ABSTRACT

A machine tool has a rotatably mounted part and a rotary leadthrough connected thereto, through which a fluid can be delivered to the rotatably mounted part. The rotary leadthrough further comprises an outlet from which leaking fluid emerges in the event of a leak in the rotary leadthrough. The outlet is connected to a fluid sensor which detects the emerging fluid and reports the leak.

18 Claims, 3 Drawing Sheets

MACHINE TOOL WITH A ROTATABLE SUPPORTED PART

BACKGROUND OF THE INVENTION

1. Field of the Invention

The present invention relates to a machine tool having a rotatably mounted part and a rotary leadthrough connected thereto, through which a fluid can be delivered to the rotatably mounted part, the rotary leadthrough having an outlet from which leaking fluid emerges in the event of a leak in the rotary leadthrough.

2. Related Art

Machine tools of this kind are known from the related art.

The rotatably mounted part is, for example, a spindle to which cooling and rinsing fluid, which is used for internal cooling of the tools received in the spindle and for rinsing, is delivered via the rotary leadthrough. The rotary leadthroughs are as a rule configured so that they seal themselves when the fluid is delivered under pressure. As a rule, one nonrotatable and one rotatable tube part are provided for this purpose, a sliding ring being arranged on each tube part.

The two sliding rings rest against one another with their sealing surfaces and thus constitute a joint between the tube parts, at which they provide a seal for the fluid flowing through the tube parts. In this context, the nonrotatable tube part is arranged displaceably in the longitudinal direction and joined to a rubber sleeve on which the inflowing fluid exerts a pressure such that the sealing surfaces seal the joint despite their movement relative to one another.

The joint is surrounded by a leakage space which is otherwise sealed with respect to the machine tool but has an outlet from which the leaking fluid emerges. Said leaking fluid is sent from the outlet in undefined fashion into the machine, where it nevertheless can as a rule cause no damage.

This sealing of the leakage space is intended to prevent the leaking fluid from causing damage to the motors, bearings, etc. of the spindle, i.e. serves to increase the operating reliability of the machine tool equipped in this fashion. This is because if the spindle head in which the spindle is rotatably mounted were flooded with coolant or rinsing fluid, this would, for example, wash the grease out of the bearings, and their service life would thereby be reduced. In addition, said fluid could enter the motors and there result in short-circuits or cause corrosion.

To this extent, therefore, the use, known per se, of a rotary leadthrough ensures that the machine tool equipped in this fashion has high operating reliability.

SUMMARY OF THE INVENTION

In view of the above, it is an object of the present invention to increase the operating reliability and machining quality of the known machine tool with a physically simple design.

In the case of the machine tool mentioned at the outset, this object is achieved, according to the invention, by the fact that the outlet is connected to a fluid sensor which detects the emerging fluid and reports the leak.

The object underlying the invention is completely achieved in this fashion.

Specifically, the inventor has recognized that operating reliability can be impaired not only by flooding with leaking fluid, but also by the fact that the leaking fluid does not arrive at its intended location, where its "absence" can also lead to damage. For example, a major leak in the rotary leadthrough can lead to failure of internal cooling of the tools or delivery of rinsing fluid, so that the tool heats up impermissibly and/or chips and dust particles can no longer be removed from the tool or workpiece.

The use of the fluid sensor in conjunction with the rotary leadthrough now ensures protection of the workpiece and tool by the fact that the reported leak leads to an interruption in machining. For this purpose, the fluid sensor can, for example, be connected to the sequence controller of the machine tool, although it is also possible simply for a visible or audible alarm to be triggered, which then prompts operating personnel to interrupt the working process.

The new machine tool thus makes possible a simple process monitoring system which not only increases the operating reliability of the new machine tool, but moreover also ensures better machining quality than was possible with the related art.

In an embodiment, it is preferred if the fluid sensor reports the emergence of fluid only above a specific leakage rate.

The advantage here is that slight leaks during activation of, for, example, the internal cooling system are not reported, but instead only a serious leak leads to a report. In other words, a leak which often occurs upon activation of the internal cooling system at the rotary leadthrough, which then seals itself, is not reported, and neither is a slight leak which leads to only a dripwise loss of fluid. The inventor has recognized that such insignificant leaks do not yet have a disadvantageous influence on the operating reliability and machining quality of the machine tool, which occurs only in the case of larger leaks with a corresponding loss of fluid.

In this context, it is preferred if the fluid sensor has two electrodes which project preferably from above into a conduit through which the leaking fluid passes, the two electrodes preferably projecting into the conduit one behind the other in the direction of the fluid flow.

This feature is advantageous in design terms: selecting the dimensions of the conduit and/or of the spacing of the two electrodes from one another defines, so to speak, a switching threshold above which the two electrodes sense the fluid. Small quantities of leaking fluid pass through the conduit without allowing both electrodes to come into contact with the fluid, so that discrimination between insignificant and serious leakage is possible with the simplest possible design. This fluid sensor can thus be used on the machine tool for the widest variety of leak monitoring tasks simply by selecting the geometrical dimensions of the conduit and the arrangement of the electrodes. If the electrodes project into the conduit from the side, the switching threshold is also influenced by the height of the openings for the electrodes in the conduit.

In an embodiment, it is preferred if the two electrodes are connected to a voltage source and to a measuring instrument which measures an electrical variable of the fluid, the electrical variable preferably being a resistance or a capacitance.

This feature is also advantageous in terms of design because the measuring instrument must, for example, simply monitor a change in the capacitance or the conductivity of the measurement space between the two electrodes, said change in the electrical variable occurring due to the fact that the leaking fluid entirely or partly fills up said space. The value of the change in resistance or capacitance can then be taken as the threshold value, so that here again a distinction can easily be made between less significant and more serious leaks. It is particularly advantageous, however, if the threshold value is predefined by, the dimensions of the conduit and the arrangement of the electrodes, and the measuring instrument must simply report, as a yes/no decision, whether or not fluid is present between the electrodes.

It is preferred in general if the fluid sensor comprises a mounting block, attached to the machine tool, in which the conduit into which the electrodes project is provided, the electrodes preferably being screws that are screwed from outside into threaded holes in the mounting block.

This feature is advantageous in design terms because the result here is an extremely simple configuration. All that is necessary is to provide a mounting block having the corresponding conduit, into which two screws are then screwed from outside to act as electrodes. This fluid sensor can thus also be easily retrofitted to existing machine tools.

It is further preferred if holes are provided, extending perpendicular to the threaded holes and opening into them, into which are inserted connecting wires which are connected electrically to the screws.

The advantage here is on the one hand that contact can easily be made with the screws, while good external sealing of the conduit is nevertheless ensured. Said sealing is accomplished by the fact that the screws seal appropriately. Since the holes provided for the connecting wires open not into the conduit itself but into the threaded holes for the screws, said further holes do not represent an additional leakage source. A further advantage of this entire design is thus the fact that the leaking fluid is no longer discharged in undefined fashion into the machine tool, but rather can drip correspondingly from the conduit provided in the mounting block into, for example, a collection sump.

It is further preferred in this context if the connecting wires are secured to the mounting block by means of a strain relief, preferably a retaining clamp.

The advantage with this feature is that inadvertent detachment of the connecting wires is prevented, so that the operating reliability of the fluid sensor and thus of the machine tool monitored by it is increased.

It is preferred in general if the fluid sensor is arranged below the outlet of the rotary leadthrough, and the outlet is preferably connected to the fluid sensor via a hose that represents a continuous descending gradient for the leaking fluid.

The advantage here is that the leaking fluid does not collect in the rotary leadthrough, but rather is continuously discharged from the leakage space provided there. This on the one hand ensures that a large quantity of fluid does not collect in the rotary leadthrough and ultimately get into bearings or motors of the machine tool, but rather—as stated—is continuously removed. A further advantage consists in the fact that whatever leak exists sends the fluid to the fluid sensor, which is therefore not "deceived" by incorrect results. Specifically, if the fluid sensor were arranged above the outlet, the leaking fluid would initially collect in the fluid space and in the hose, without being able to reach the fluid sensor. When a certain quantity of fluid has then flowed out, a sort of flooding of the fluid sensor with fluid may then occur, which the latter then reports as a leak even though a large quantity of leaking fluid has in fact collected only as a result of dripwise loss over a longer period of time.

In the case of the rotary leadthrough, it is also advantageous if it has a nonrotatable and a rotatable tube part, if a sliding ring is arranged on each of the two tube parts, and if the two sliding rings rest against one another with their sealing surfaces and thus constitute a joint between the tube parts and provide sealing of the fluid flowing through the tube parts; preferably the nonrotatable tube part is arranged displaceably in the longitudinal direction and is joined to a pressure surface onto which flowing fluid exerts a pressure such that the sealing surfaces, despite their motion relative to one another, effect sealing of the joint, which is preferably surrounded by a leakage space that is otherwise sealed with respect to the machine tool and is connected to the outlet.

These features provide, in a physically simple manner, for a self-sealing rotary leadthrough, such that a leak in the region of the sliding rings leads to an outflow of fluid into the leakage space, from which said fluid can, however, pass not into the machine tool but only via the outlet to the fluid sensor.

Further advantages are evident from the description and the appended drawings.

It is understood that the features mentioned above and those yet to be explained below can be used not only in the respective combinations indicated, but also in other combinations or in isolation, without leaving the context of the present invention.

BRIEF DESCRIPTION OF THE DRAWINGS

An embodiment of the invention is shown in the drawings and will be explained in more detail in the description below. In the drawings.

DETAILED DESCRIPTION OF THE PREFERRED EMBODIMENT

Figure 1:
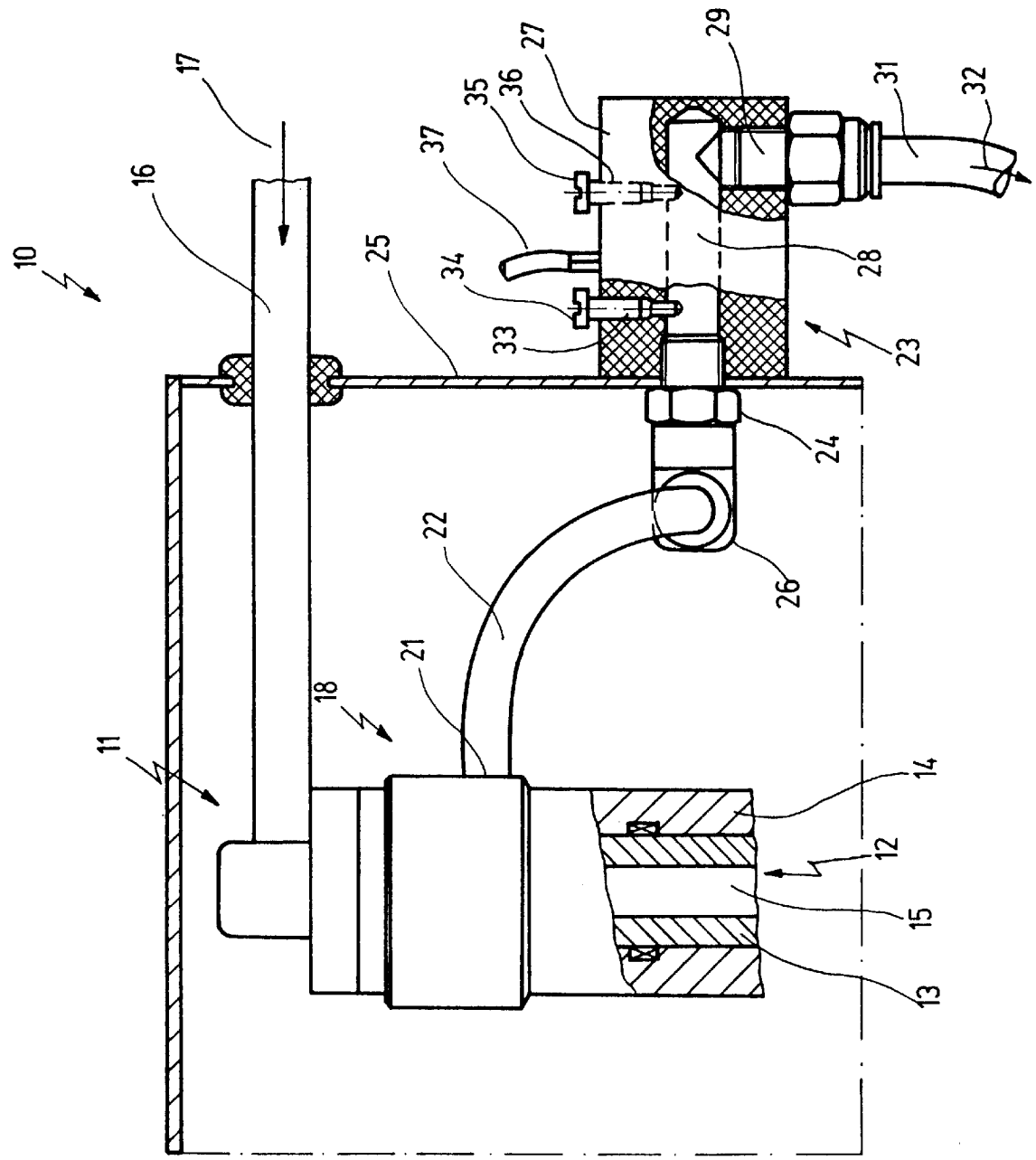
FIG. 1 shows a schematic and partial representation of the new machine tool with rotary leadthrough and fluid sensor (depicted in section)

In FIG. 1, 10 designates a machine tool which comprises a spindle head, indicated at 11, in which a spindle 13 is mounted as a rotatable part 12. Spindle 13 is mounted in known fashion in a spindle tube 14 and has a centered internal conduit 15 through which fluid, in the form of coolant or rinsing fluid, passes to a tool receptacle (not shown in FIG. 1) of spindle 13, where said fluid is used to cool and/or rinse the working tool.

Also evident in FIG. 1 is a supply line 16 through which the fluid is delivered, in the direction of an arrow 17, to a rotary leadthrough 18 that is arranged between supply line 16 and spindle head 11. Said rotary leadthrough 18 seals automatically, in a manner to be described later in conjunction with FIG. 2, as soon as fluid is introduced under pressure into supply line 16.

If a leak should occur in rotary leadthrough 18, the leaking fluid emerges from rotary leadthrough 18 at an outlet 21 and passes through a hose 22 to a fluid sensor 23 that is attached by means of a bolt 24 to a housing wall 25. Said bolt 24 is simultaneously joined to a connector piece 26 into which hose 22 opens. Bolt 24 thus performs two tasks: on the one hand it attaches fluid sensor 23 to housing wall 25, and on the other hand it connects fluid sensor 23 to hose 22.

Fluid sensor 23 comprises a mounting block 27 in which is provided a conduit 28 which communicates at the end with a hole 29 extending downward. Bolt 24, which itself has a conduit, is screwed into said conduit 28 from the left in FIG. 1, so that fluid enters conduit 28 through bolt 24. This leaking fluid exits through hole 29 into a leakage hose 31 connected there which guides the leaking fluid, indicated at 32, into, for example, a collection sump.

A threaded hole 33, into which a first screw 34 is screwed in such a way that it projects with its lower end into conduit 28, opens into conduit 28. Arranged behind screw 34 in the flow direction of the fluid is a further screw 35, which is screwed into a further threaded hole 36. Further screw 35 also projects with its lower end into conduit 28.

The two screws 34, 35 are connected, in a manner to be described later, to a connecting cable 37, and serve, again in a manner to be described later, to detect and report the emerging fluid which passes into conduit 28.

Figure 2:
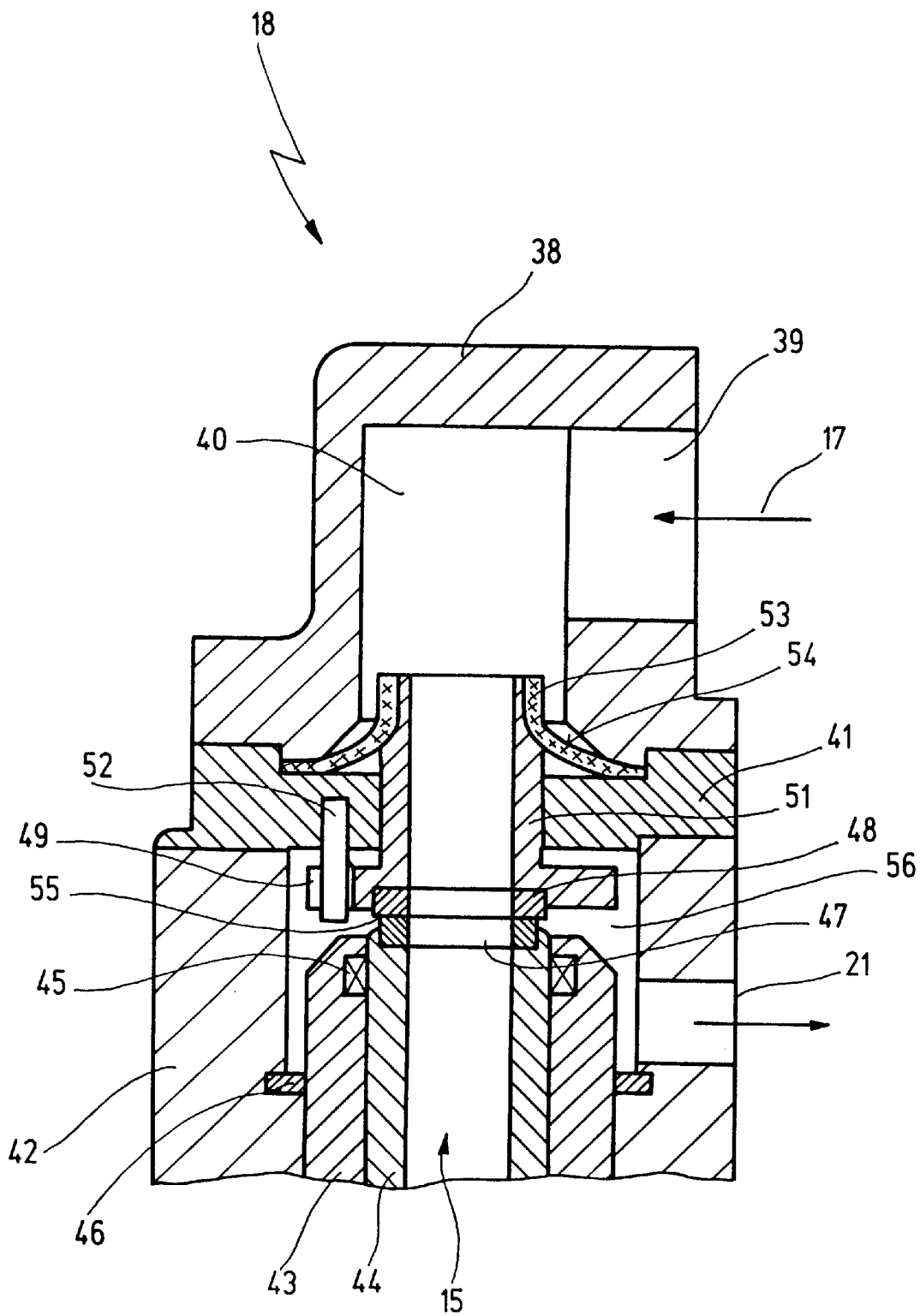
FIG. 2 shows a sectioned depiction of the rotary leadthrough of FIG. 1.

First of all, however, FIG. 2 schematically depicts rotary leadthrough 18 in longitudinal section. Rotary leadthrough 18 comprises firstly a cup-shaped cover part 38 into which the fluid arrives through an inlet opening 39 and collects in an interior space 40.

Adjoining cover part 38 is an intermediate part 41, followed below in FIG. 2 by a base part 42. Arranged in base part 42 is a sleeve 43 in which a tube part 44 is rotatably mounted and in turn is joined nonrotatably to spindle 13 of FIG. 1. Rotatable tube part 44 correspondingly has conduit 15, which also passes through spindle 13.

Rotatable mounting of tube part 44 on sleeve 43 is accomplished by means of bearing 45. Also provided between sleeve 43 and base part 42 is a seal 46 whose significance will be explained below.

Rotatable tube part 44 has at its upper end a sliding ring 47 that coacts with a further sliding ring 48 which is mounted in a flange 49. Said flange 49 sits on a nonrotatable tube part 51 which is mounted in longitudinally displaceable but nonrotatable fashion on intermediate part 41. For this purpose, intermediate part firstly has a pin 52 which engages into flange 49 so that the latter is held nonrotatably but longitudinally displaceably with respect to intermediate part 41.

Nonrotatable tube part 51 has at its upper end a rubber sleeve 53 which is clamped at its outer rim between cover part 38 and intermediate part 41. Since the rubber sleeve is secured additionally at the upper end of nonrotatable tube part 51, it allows displacement of tube part 51 upward and downward in FIG. 2.

Rubber sleeve 53 has, facing upward in FIG. 2, a pressure surface 54 with which the fluid flowing into interior space 40 comes into contact and thereby presses tube part 51 downward, so that the two sliding rings 47 and 48 are pressed together at their sealing surfaces. Said sealing surfaces constitute a joint 55 between the two tube parts 44 and 51.

When no fluid is flowing through rotary seal 18, the two sliding rings 47, 48 can be at a certain distance from one another; but this is reduced to zero as soon as fluid presses onto pressure surface 54 of rubber sleeve 43. Before joint 55 is completely sealed in this fashion, however, a certain amount of fluid can emerge laterally between the two sliding rings 47, 48 and pass into a leakage space 56 surrounding joint 55. Said leakage space is sealed toward the bottom in FIG. 2 by the aforementioned seal 46, so that fluid collecting in leakage space 56 cannot emerge downward into the spindle. Said fluid instead enters hose 22 through outlet 21, already known from FIG. 1, and there arrives at fluid sensor 23.

Returning to FIG. 1, it is evident that fluid sensor 23 is arranged below outlet 21, and that hose 22 is curved continuously downward, so that it represents a continuous descending gradient for the leaking fluid emerging from outlet 21. This prevents a large quantity of fluid from collecting in leakage space 56.

Figure 3:
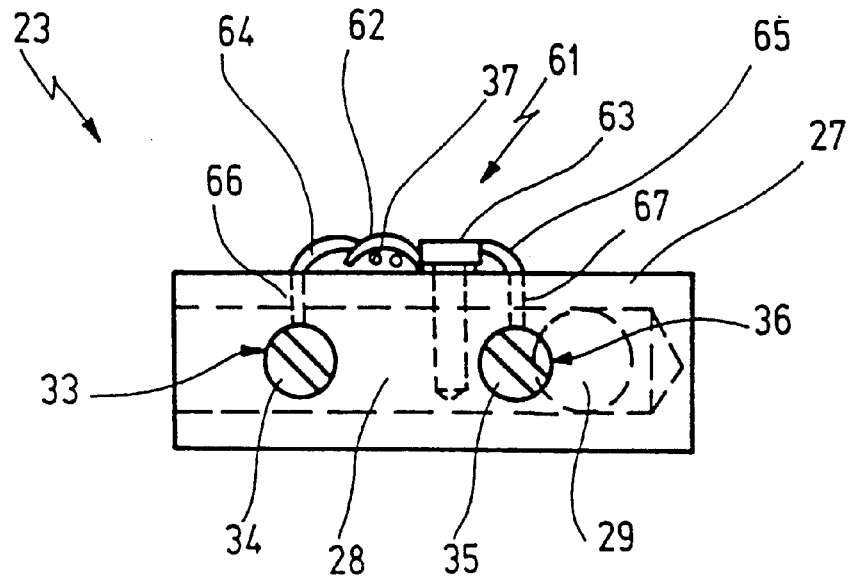
FIG. 3 shows a plan view of the fluid sensor of FIG. 1.

FIG. 3 now depicts fluid sensor 23 of FIG. 1 in a plan view, so that the two screws 34 and 35 are visible from above. A strain relief 61 for connecting cable 37, consisting of retaining clamp 62 and attachment screw 63, is provided laterally on mounting block 27. Retaining clamp 62 presses connecting cable 37, which consists of two connecting wires 64 and 65, laterally against mounting block 27 and holds it there nondisplaceably.

The two connecting wires 64 and 65 occupy holes 66 and 67, respectively, which extend perpendicular to threaded holes 33 and 36, respectively, into which they also open. Provision is thereby made for an electrical connection between screws 34, 35 and connecting wires 64, 65.

The function of fluid sensor 23 will now be explained with reference to the schematic electrical circuit diagram of FIG. 4:

The two screws 34 and 35 define between them a measurement space 70, i.e. act as electrodes 71 and 72, respectively. Said two electrodes 71 and 72 are connected via connecting wires 64 and 65, respectively, to a series circuit made up of a voltage source 73 and a measuring resistor 74. Connected in parallel with measuring resistor 74 is a measuring instrument 75 that is connected to a machine controller 76 of the new machine tool 10.

When a sufficient quantity of fluid now collects in conduit 28, the two screws 34, 35 ultimately come into electrical contact with said fluid. Voltage source 73 can then send a current through the fluid, which leads to a voltage drop at measuring resistor 74. This voltage drop is measured by measuring instrument 75 and forwarded to machine controller 76, which interrupts the machining process because of the leakage that has thus been reported.

Figure 4:
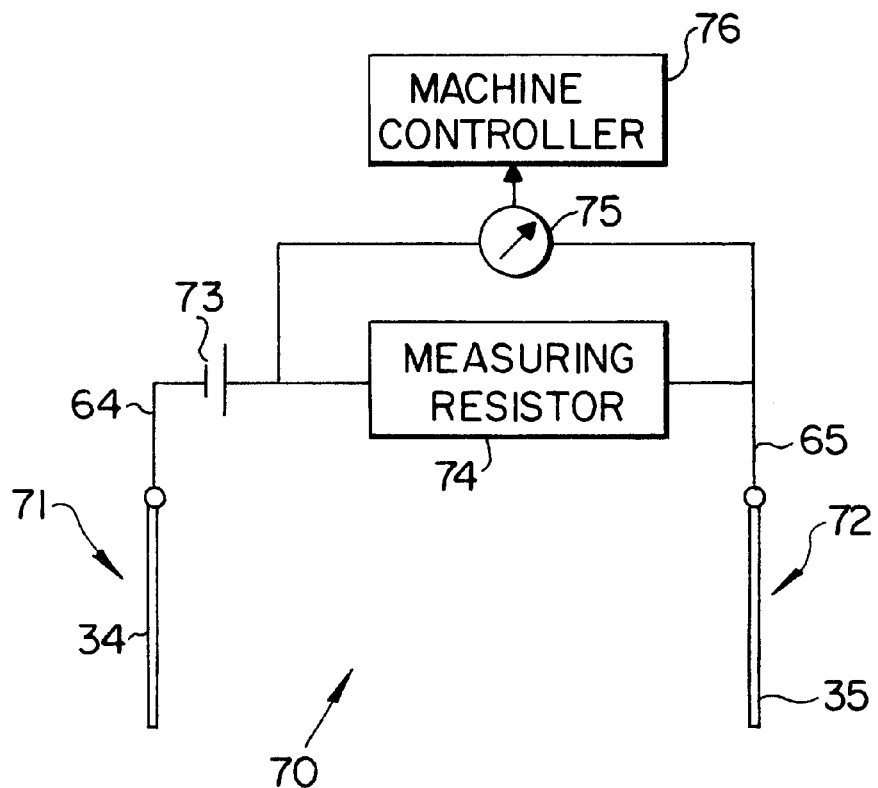
FIG. 4 shows a circuit diagram which indicates the electrical wiring of the electrodes from the fluid sensor of FIGS. 1 and 3.

The circuit shown in FIG. 4 thus utilizes the electrical conductivity of fluid in order to measure and report via measuring instrument 75, as a yes/no decision, the presence of fluid in measurement space 70. Of course it is also possible to measure the capacitance or another electrical variable of the fluid instead of the electrical conductivity.

Therefore, what we claim is:

1. Machine tool having a rotatably mounted part and a rotary leadthrough connected thereto, through the latter a fluid can be delivered to the rotatably mounted part via a reliable sealing means that serves to prevent likelihood of a leak event, the rotary leadthrough having an outlet from which leaking fluid emerges in the event of a leak in the rotary leadthrough, wherein the outlet is connected to a fluid sensor which detects the emerging fluid and reports the leak, the fluid sensor has two electrodes which project preferably from above into a conduit through which the leaking fluid passes, and the fluid sensor comprises a mounting block, attached to the machine tool, in which the conduit into which the electrodes project is provided.

2. Machine tool according to claim 1, wherein the fluid sensor reports the emergence of fluid only above a specific leakage rate.

3. Machine tool according to claim 1, wherein the electrodes project into the conduit one behind the other in the direction of the fluid flow.

4. Machine tool according to claim 1, wherein the two electrodes are connected to a voltage source and to a measuring instrument which measures an electrical variable of the fluid.

5. Machine tool according to claim 4, wherein the electrical variable is a resistance.

6. Machine tool according to claim 1, wherein the electrodes are screws that are screwed from outside into threaded holes in the mounting block.

7. Machine tool according to claim 6, wherein holes are provided, extending perpendicular to the threaded holes and opening into them, into which are inserted connecting wires which are connected electrically to the screws.

8. Machine tool according to claim 7, wherein the connecting wires are secured to the mounting block by means of a strain relief, preferably a retaining clamp.

9. Machine tool according to claim 4, wherein the electrical variable is a capacitance.

10. Machine tool having a rotatably mounted part and a rotary leadthrough connected thereto, through the latter a fluid can be delivered to the rotatably mounted part via a reliable sealing means that serve to prevent likelihood of a leak event, the rotary leadthrough having an outlet from which leaking fluid emerges in the event of a leak in the rotary leadthrough, wherein the outlet is connected to a fluid sensor which detects the emerging fluid and reports the leak, the fluid sensor has two electrodes which project preferably from above into a conduit through which the leaking fluid passes, the rotary leadthrough has a nonrotatable and a rotatable tube part, a sliding ring is arranged on each of the two tube parts, and the two sliding rings rest against one another with their sealing surfaces and thus constitute a joint between the tube parts and said sealing means, the nonrotatable tube part being arranged displaceably in the longitudinal direction and joined to a pressure surface onto which flowing fluid exerts a pressure such that the sealing surfaces, despite their motion relative to one another, effect sealing of the joint.

11. Machine tool according to claim 10, wherein the joint is surrounded by a leakage space that is otherwise sealed with respect to the machine tool and is connected to the outlet.

12. Machine tool according to claim 10, wherein the fluid sensor reports the emergence of fluid only above a specific leakage rate.

13. Machine tool according to claim 10, wherein the electrodes project into the conduit one behind the other in the direction of the fluid flow.

14. Machine tool according to claim 10, wherein the two electrodes are screws that are connected to a voltage source and to a measuring instrument which measures an electrical variable of the fluid.

15. Machine tool according to claim 14, wherein the electrical variable is a capacitance.

16. Machine tool according to claim 14, wherein the electrical variable is a resistance.

17. Machine tool according to claim 10, wherein the fluid sensor comprises:

a mounting block, attached to the machine tool, having conduits into which the electrodes project.

18. Machine tool according to claim 17, wherein the electrodes are screws that are screwed from outside into threaded holes in the mounting block.

* * * * *